United States Patent Office 3,191,892
Patented June 29, 1965

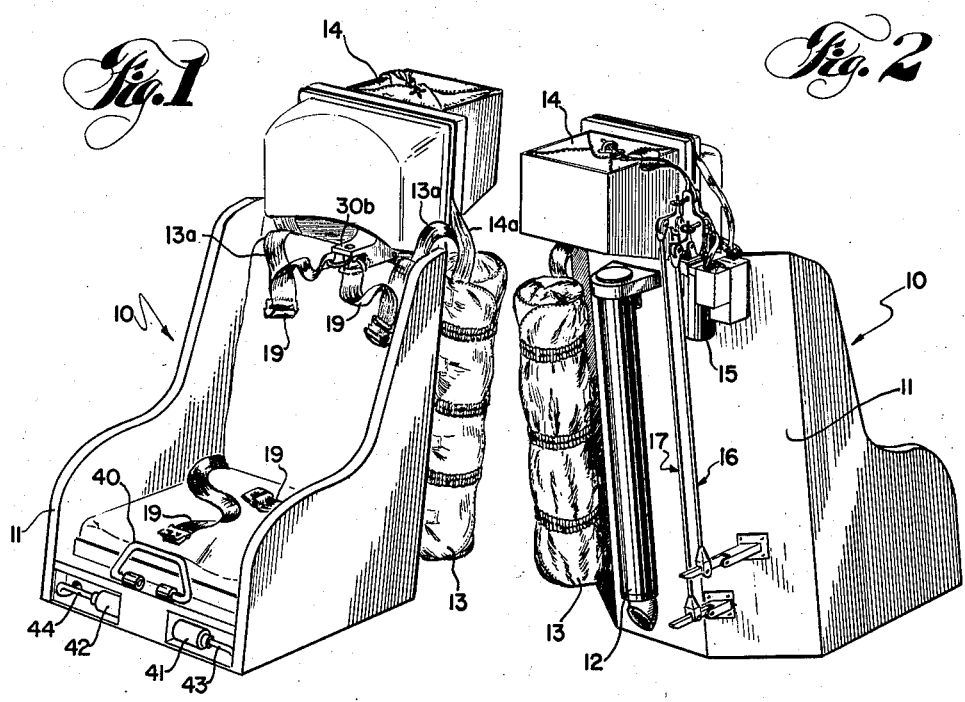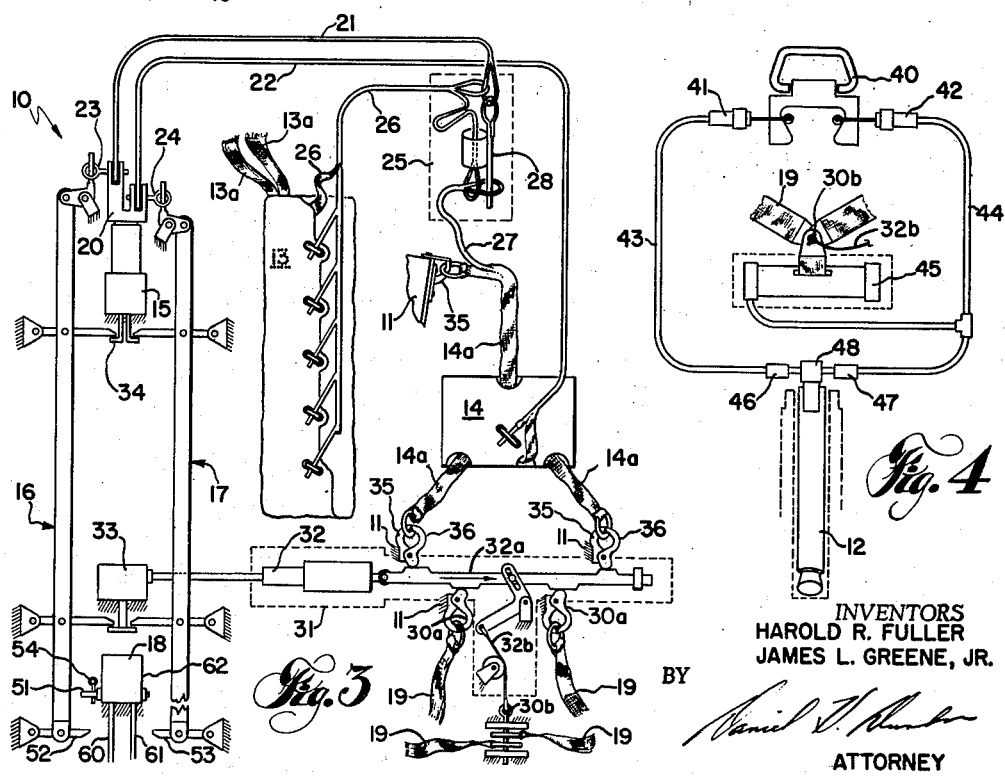
INVENTORS
HAROLD R. FULLER
JAMES L. GREENE, JR.
ATTORNEY

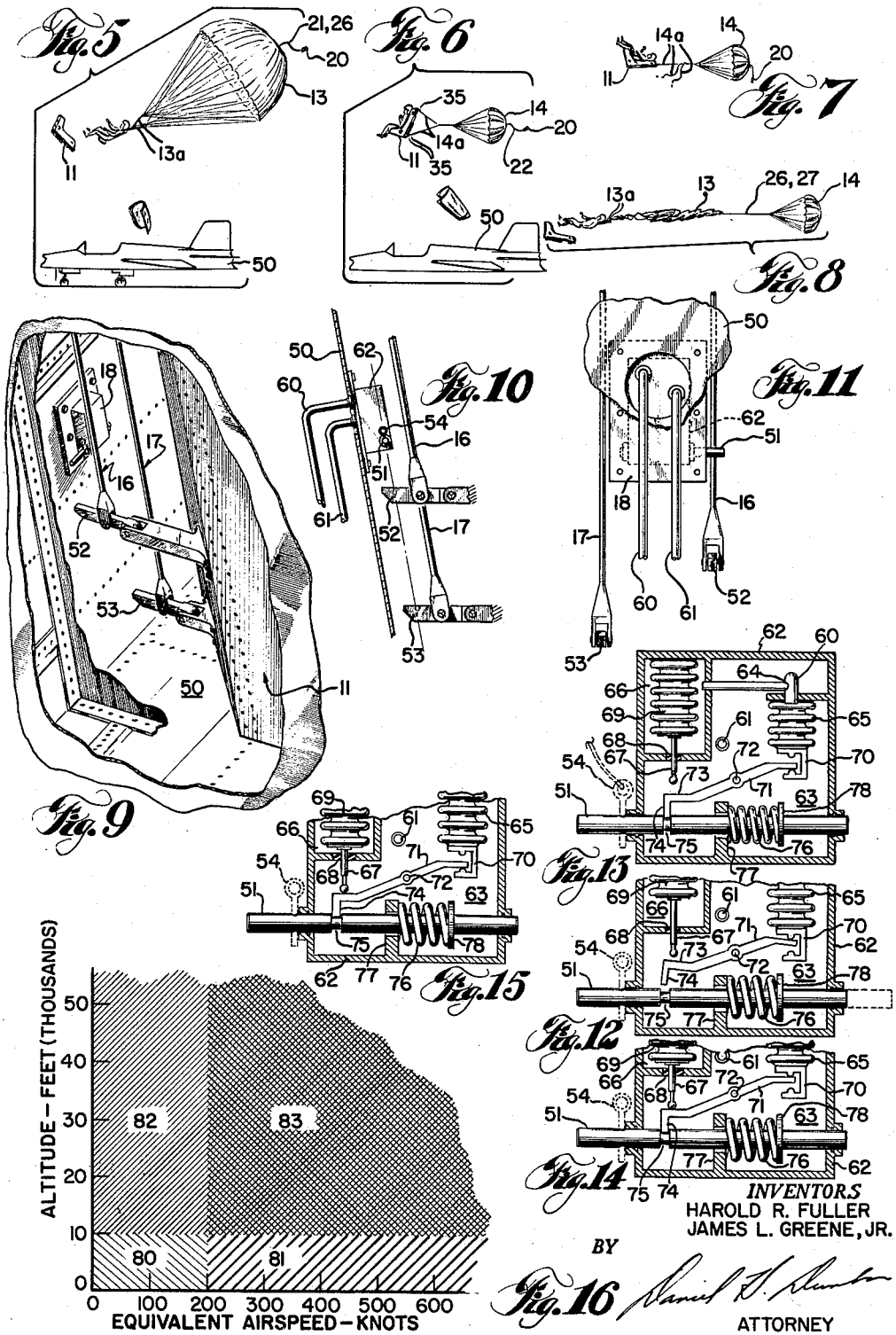

3,191,892
EJECTION SEAT FOR AIRCRAFT
Harold R. Fuller and James L. Greene, Jr., Columbus,
Ohio, assignors to North American Aviation, Inc.
Filed June 25, 1964, Ser. No. 377,859
4 Claims. (Cl. 244—122)

This invention relates generally to an ejection seat for aircraft, and particularly concerns an ejection seat system which has two modes of operation to develop an improved performance capability relative to the recovery of operating personnel in aircraft emergency situations.

Known ejection seat systems for high-performance aircraft have typically utilized the sequential deployment of a system drogue parachute and a combined personnel parachute to effect the recovery of aircraft operating personnel from emergency situations. The primary purpose for utilizing the drogue parachute initially in the escape sequence is to assure seat stabilization prior to deployment of the system personnel parachute and to develop a degree system deceleration from high airspeeds. The typical known high-performance aircraft ejection seat system, however, has proven deficient in at least one aspect of its recovery capability. At low aircraft operating altitudes (e.g., 0 to 1,000 feet), and often at low aircraft operating airspeeds (e.g., 0 to 100 knots), the delay in deployment of the system personnel parachute can result in ultimate occupant injury and therefore an undesirable system recovery performance capability. Such is particularly true with respect to zero-speed, zero-altitude situations and other situations and other situations near the low-performance region of the aircraft flight envelope. We have discovered that the known performance deficiency of ejection seat systems for high-performance aircraft may be overcome by incorporating at least two operating modes therein.

An important object of our invention, accordingly, is to provide an ejection seat system for high-performance aircraft with a capability for operating in different modes depending upon aircraft operating altitude or aircraft operating airspeed.

Another object of our invention is to provide an ejection seat system for high-performance aircraft with a selector means for automatically establishing a preferred mode of system operation.

A further object of this invention is to provide an ejection seat system for high-performance aircraft with construction features which result in economical manufacture, ease of maintenance, and improved operating reliability.

Other objects and advantages of this invention will become apparent from a careful reading of the specification and the drawings.

In the drawings:

FIGS. 1 and 2 are perspective views of an aircraft ejection seat system incorporating the features of our invention;

FIG. 3 is a schematic illustration of the principal components of the aircraft ejection seat system of FIG. 1 in their cooperating relation;

FIG. 4 is a schematic illustration of the ballistic initiator subsystem preferably incorporated in the system of FIG. 1;

FIG. 5 illustrates the preferred mode of operation of the aircraft ejection seat system of our invention for low-altitude and low-airspeed situations;

FIGS. 6 through 8 illustrate phases of the alternate mode of operation of the seat system of FIG. 1 for high-performance situations;

FIG. 9 is a perspective view showing the installation of the system of FIG. 1 in an aircraft;

FIGS. 10 and 11 are elevational views of a mode selector means utilized in connection with our invention;

FIGS. 12 through 15 illustrate the operating conditions of the system mode selector means of FIGS. 9 through 11 in various aircraft operating situations; and FIG. 16 graphically illustrates the different modes of aircraft ejection seat system operation as a function of typical altitudes and airspeed parameters.

FIGS. 1 and 2 perspectively illustrate an aircraft ejection seat system 10 having the features of our invention in a preferred embodiment. Such system includes a basic seat structure 11 which is normally ejected from within an aircraft in emergency situations by the attached conventional rocket catapult unit 12. The system also includes a personnel parachute 13 and a seat stabilization parachute 14 combination that is deployed in emergency situations by the deployment gun designated 15. Such parachutes are preferably carried within suitable containers or cases and are respectively provided with parachute riser straps 13a and 14a. Depending upon aircraft flight conditions (altitude and speed) which exist at the time of an emergency ejection, parachutes 13 and 14 are deployed as a combination or parachute 13 is deployed alone. The two modes of system parachute deployment are related in the preferred embodiment to: (1) a low airspeed and low altitude aircraft operating condition, or (2) a high airspeed or a high altitude aircraft operating condition. The means for selecting and initiating the preferred manner of parachute deployment are designated 16, 17, and 18 in the drawings. Mode selector means 18 is considered to be a part of ejection seat system 10 even though it is preferably secured to structural components of the aircraft which carries the seat system. Also, the system includes strap means 19 for properly securing the seat occupant in the system.

The principal components of ejection seat system 10 are also illustrated schematically in FIG. 3. Deployment gun 15 has a linearly-separable deployment slug 20 which is detachably coupled to the system parachutes 13 and 14 through separate lanyards 21 and 22 and the selectively removable retainer pins designated 23 and 24. Parachutes 13 and 14 are additionally coupled to deployment gun 15 through lanyards 26 and 27 and through the disconnect coupling designated 25. Lanyard 26 is coupled to lanyard 21 at all times through their interconnected mid-length and terminal loops. However, lanyard 27 may be detached from the loop-interconnected lanyard 21–26 combination by the removal of withdrawal pin 28 by deployment slug 20 during a low-speed and low-altitude emergency ejection initiated through means 17. Lanyard 22 is normally always coupled to stabilization parachute 14 but is made inoperative in the system by removal of retainer pin 24 through actuation of initiation means 17.

Seat system 10 also includes retention means 30a and 30b for securing the seat occupant in position during an emergency ejection sequence. Means 30a and 30b cooperate primarily with the attachment rings located at an end of each of straps 19; straps 19 in turn are joined to a torso harness (not shown) normally worn by the seat occupant. A release mechanism 31 is provided, therefore, in seat system 10 to effect release of the occupant from restraint by seat structure (through retention means 30a and 30b) at the time of seat-occupant separation subsequent to system ejection. Release mechanism 31 includes a time-delay gas generator and actuator combination 32 that is initiated by the conventional aneroid-blocked power device identified schematically by the reference 33. Unit 32, when actuated, causes shaft 32a to move linearly releasing retention means 30a (and 36) for opening and causes cable 32b to move linearly withdrawing the removable restraint pin portion of retention means 30b. In its usual form, device 33 is a spring-loaded power unit which generates an initiation force when operated but which is inoperative at all times that it is subjected to an environment above a given reference altitude (e.g., 10,000 feet). If power device 33 is actuated (as by means 16 or 17) at altitudes below the preselected reference altitude, the device immediately powers initiation of the time-delay gas generator-actuator combination 32 to in turn cause the release of retention means 30 (or 36) after a predetermined time period. In one embodiment of an ejection seat system incorporating our invention we utilize a time-delay period of 0.5 second for the gas generator-actuator combination 32. If device 33 is actuated above the preselected reference altitude, the included aneroid block prevents initiation of means 32 with its time delay until the reference altitude is reached.

The seat system illustrated in FIG. 3 also includes attachment points 35 for securing portions of stabilization parachute 14 to seat structure 11 in the manner of the arrangement disclosed by U.S. Letters Patent No. 3,027,126. Since it is preferred that stabilization parachute 14 be released from seat structure at the time of seat-occupant separation, additional retention means 36 are provided to secure the lower-most risers of 14a of parachute 14 to seat system 10. The lower-most of risers 14a are released from retention means 36 through the operation of release mechanism 31.

FIG. 4 illustrates schematically those conventional components which may be utilized to initiate operation of the entire seat system. The disclosed arrangement includes an initiator handle 40 which actuates parallel-installed gas generator devices 41 and 42. High-pressure gases generated by devices 41 and 42 are ported through parallel-installed lines 43 and 44 to actuate inertia harness reel 45. Inertia reel 45 is of conventional design and operates to position attached straps 19 at a preferred position relative to seat structure 11 so as to properly restrain the seat occupant at the time of seat initiation. A portion of retention means 30b in the form of a removable pin functions to secure an upper extreme of harness straps 19 to inertia reel 45; a portion of release mechanism 32b in the form of a cable connected to the pin functions to release the upper ends of straps 19 from restraint by harness reel 45 at the time of seat-occupant separation. High-pressure gases received from devices 41 and 42 initiate the primer unit designated 48; primer unit 48, in turn operates to initiate the firing of rocket catapult unit 12 when activated. One-way check valves 46 and 47 prevent such gases from being exhausted through the opposite line in by-pass relation to primer unit 48.

FIGS. 5 through 8 illustrate the two preferred different modes of operation for ejection seat system 10 to develop an improved system escape recovery capability. The mode illustrated by FIG. 5 is preferred for emergency escape situations where the incorporating aircraft is operating at a low airspeed and a low altitude. The low-airspeed, low-altitude flight region, in one embodiment of our invention, includes zero-airspeed, zero-altitude situations. The mode of operation illustrated by FIGS. 6 through 8, on the other hand, is preferred for emergency ejection situations where the incorporating aircraft is experiencing either high-airspeed or high-altitude flight. As to this mode of operation, a specific embodiment of our invention has been used for all emergency ejection situations at aircraft airspeeds over 200 knots and at aircraft operating altitudes over 10,000 feet.

In the FIG. 5 arrangement, deployment slug 20 is ejected by deployment gun 15 in response to the actuation of initiation means 17 (FIG. 3) as the seat structure 11 leaves airplane 50 in response to propulsion forces generated by rocket catapult 12. Slug 20 thereafter deploys personnel parachute 13 through the lanyard 21, 26 combination. During such deployment, withdrawal pin 28 is removed from the loop end extremity of lanyard 27 to disconnect the slug from attachment to stabilization parachute 14.

In the FIGS. 6 through 8 mode of operation, stabilization parachute 14 is initially deployed by deployment slug 20 as seat structure 11 leaves airplane 50. Stabilization parachute 14 is attached to seat structure 11 at the stabilization points designated 35 to assure proper seat orientation and deceleration after ejection. At the time of initiating seat-occupant separation (FIG. 7), stabilization parachute 14 may operate to rotate seat structure 11 to an essentially horizontal position. The horizontal position of seat structure 11 at the time of seat-occupant separation is particularly desirable if a separation means such an inflatable bladder (not shown) is employed in the system. When stabilization parachute 14 has rotated structure 11 to a proper position, it is released from the seat structure and through the lanyard 26, 27 and coupling 25 combination causes deployment of personnel parachute 13. In this respect it should be noted that the interconnect means 25 does not operate to disengage the aforementioned lanyards as in the case of a low-airspeed and low-altitude ejection sequence; however, that combination of lanyards is freed from restraint by deployment gun 15 and deployment slug 20 through the withdrawal of retainer pin 23 at the time of mode initiation by means 16.

We prefer that the mode of operation for ejection seat system 10 be established by a selector means 18 that is responsive to different aircraft operating conditions at the time seat structure 11 is first moved along its ejection path from within airplane 50. As shown in FIG. 9, selector means 18 is preferably attached to structure of airplane 50 at a fixed position and has a movable trip-pin 51 that projects into the path of either trip-lever 52 or trip-lever 53 of assemblies 16 and 17 depending upon sensed aircraft flight conditions. Pin 51 makes contact with one of such striker assembly trip-levers only and then only after safetying pin 54 has been withdrawn from pin 51 during initial seat movement by a cable-like connection (not shown) to seat structure 11. In one embodiment of our invention, trip-lever 53 is provided for the low-airspeed and low-altitude situation selection and is located at a position lower than trip-lever 52 provided for a high-speed or high-altitude deployment. The difference in position height of the trip-levers gives added time for trip-pin 51 to be moved from its normal FIG. 9 position to its alternate low-airspeed and low-altitude position following withdrawal of safetying pin 54, but only for the low-airspeed and low-altitude emergency situation.

Additional details regarding mode selector means 18 are provided in FIGS. 10 through 14. In FIGS. 10 and 11, we illustrate pressure-sensing lines 60 and 61 which are connected to an aircraft-mounted conventional pitot sensor (not shown). Line 60 serves to transmit the static pressure condition of the aircraft's flight environment to the selector means interior. Line 61 transmits the dynamic pressure condition to the aircraft's flight environment to within the housing 62 of selector means 18.

FIGS. 12 through 15 schematically disclose the principal components of selector means 18 contained within the housing designated 62. Static line 60 passes through housing 62 and into primary chamber 63 to the T-fitting designated 64. A first branch of fitting 64 communicates the aircraft static pressure condition to the interior of the extensible bellows designated 65; the other branch of the T fitting 64 communicates the aircraft static pressure condition to a second chamber 66 which is contained within housing 62 and which is separated in pressure-communicating relation from primary chamber 63. An extensible evacuated bellows member 69 is contained within chamber 66 and is secured to one end to housing 62. The other end of bellows member 69 carries a probe 67 which passes through seal 68 into chamber 63. Probe 67 is moved relative to housing 62 in response to aircraft static pressure changes due to aircraft altitude changes which cause extension or retraction of bellows 69.

Bellows 65 is also fixed at one end relative to housing 62; the opposite or free end of bellows 65 carries an element 70 which is provided to move the adjacent end of locking beam 71 that pivots about the axis of pin 72. The free end of bellows 65 and element 70 are moved primarily in response to aircraft dynamic pressure changes which are communicated through line 61 to the interior of chamber 63. The other or opposite end of locking beam 71 is provided with a step designated 73 and with a downwardly projecting key 74. In the event beam 71 is rotated counterclockwise in response to aircraft flight conditions which call for initiation of parachute deployment by initiator means 16, key 74 is engaged with groove 74 in trip-pin 51 to prevent axial movement of trip-pin 51 to its alternate or low-altitude and low-speed position even though safetying pin 54 has been withdrawn by an initial movement of seat structure 11. A compression spring 75 is provided in selector means 18 to cause movement of trip-pin 51 to its alternate position (shown by dotted lines in FIG. 12) in the event safetying pin 54 has been removed from cooperating engagement and beam 71 has been rotated sufficiently in a clockwise manner in response to an aircraft low-altitude and low-airspeed flight condition. One end of compression spring 76 bears against the bracket designated 77 and the other end against the shoulder 78 of trip-pin 51.

The various flight conditions associated with the FIGS. 12 through 15 illustrations are, in one specific embodiment of an ejection seat including our invention, as follows. FIG. 12 illustrates the positioning of various elements within selector means 18 in response to an aircraft flight condition wherein altitude is less than a preselected value (e.g., 10,000 feet) and where airspeed is less than a preselected value (e.g. 200 knots). FIG. 13 discloses an arrangement wherein the aircraft altitude remains less than the preselected value but aircraft airspeed has been increased above the pertinent reference value so as to compress bellows 65 and cause element 70 to engage depending key 74 with groove 75. In the FIG. 13 arrangement it should be noted that the probe component 67, because it has not responded to an altitude change to above the preselected reference level, has not functioned to operate as a stop preventing disengagement of key 74 from groove 75.

The FIG. 14 arrangement discloses the manner of cooperation of the components in selector means 18 in response to an aircraft flight condition wherein flight altitude has exceeded the desired reference value but wherein the aircraft airspeed sensed and communicated by dynamic pressure line 61 remains at a value which is less than the minimum aircraft airspeed desired for initially deploying stabilization parachute 14. In the FIG. 14 arrangement the increased altitude condition (reduced pressure) permits bellows 69 to extend and place probe 67 against beam 71 to engage key 74 with groove 75. The reduced pressure condition communicated to the interior of bellows 65, it should be noted, does not have sufficient effect so as to cause element 70 to retract and additionally force key 74 into its position for preventing axial movement of trip-pin 51. In the FIG. 15 arrangement, however, both probe 67 and element 70, through their attached bellows, operate in concert to prevent axial movement of trip-pin 51 in the event safetying pin 54 should be withdrawn in connection with a seat structure ejection.

It should be noted that the various components within selector means 18 are sized and located in proper relation with each other so as to provide the necessary engaged-disengaged relations between key 74 and groove 75 at the altitude and airspeed conditions that are preselected for a particular application of our invention.

A graphical illustration of portions of a typical airspeed and altitude flight envelope for a medium-performance aircraft is shown in FIG. 16; differently hatched areas indicate the various ranges in which each of the recovery modes of ejection seat system 10 are preferably operable. The envelope area designated 80 generally requires that an ejection seat system be operated so as to effect immediate deployment of the personnel parachute 13 in the manner of the FIG. 5 illustration. The envelope areas designated 81 through 83 require that an aircraft ejection seat system be preferably operated so as to initially deploy the stabilization parachute 14 prior to seat-occupant separation. In terms of the conditions which would exist within selector means 18, area 81 conditions would cause the arrangement of FIG. 13, area 82 is associated with the arrangement of FIG. 14, and area 83 is related to the selector means interior condition of FIG. 15.

The two modes of operation for ejection seat system 10 can be described in more complete detail by reference to FIG. 3. In the low-airspeed, low-altitude aircraft flight condition initiating means 17, through its trip-lever 53, is actuated by trip-pin 51 from its alternate position as seat structure 11 is ejected from the incorporating aircraft. Means 17 extracts retaining pin 24 from deployment slug 20 and thereby disconnects slug 20 from lanyard 22 and stabilization parachute 14; deployment slug 20, however, remains connected to personnel parachute 13 through lanyards 21 and 26 and disconnect coupling 25 due to non-withdrawal of retaining pin 23. It should be noted that only one of initiator assemblies 16 and 17 is operated during an ejection sequence; the ring-ends of retaining pins 23 and 24 are readily disengaged from the cooperating adjacent bellcrank arms in any situation wherein the pin is not withdrawn by actuation of means 16 or 17.

During upward initial movement of seat structure 11 relative to the aircraft structure, both aneroid-blocked power device 33 and the deployment gun initiator designated 34 will be activated. In the case of an ejection condition below the desired altitude reference value, device 33 will operate to in effect deactivate retention means 31 concurrent with the deployment of slug 20. The inherent time-delay incorporated in generator-actuator combination 32, however, postpones the release of harness straps 19 (and stabilization parachute 14 from attach points 35) until after personnel parachute 13 has been initially moved into the surrounding aircraft airstream. Thus, as shown in FIG. 5, the seat occupant will be almost immediately separated from seat structure 11 with a fully-deployed personnel parachute 13. This mode of operation materially improves the performance capability of an ejection seat system in connection with low aircraft airspeed and low aircraft altitude flight conditions.

In high-altitude or high-airspeed flight conditions ejection seat system 10 is deployed through the initial actuation of means 16 as seat structure 11 is moved from within the incorporating aircraft. In this selected mode of operation, retainer pin 23 is withdrawn from deployment slug 20 by means 16 so as to cause lanyard 21 to become inoperative for parachute deployment purposes. Retainer pin 24, however, remains connected to deployment slug 20 and causes initial deployment of stabilization parachute 14 through lanyard 22. In high-altitude situations the simultaneously-triggered power device remains inoperative through its included aneroid block until the seat system experiences an altitude which is at or immediately below the preselected altitude reference value. At that time device 33 will operate to in effect deactivate retention means 31 thereby releasing the lower risers of stabilization parachute 14 from attachment to seat structure 11 at attach points 35. As a result of this action, stabilization parachute 14 will cause the seat structure to rotate to a generally horizontal position and the upper risers of stabilization parachute 14 will then become released from seat structure 11. The released stabilization parachute 14, through its attached combined lanyards 26 and 27 (and disconnect coupling 25) then causes deployment of personnel parachute 13. In those instances where system ejection occurs at altitudes below the reference altitude but at a flight airspeed above the preselected minimum airspeed value, power device 33 will operate to deactivate retention means 31 at the time of deployment of slug 20. The resulting parachute deployment sequence is the same as that occurring with a high-altitude ejection except that there is no delay in operation caused by the included aneroid block in unit 33. The brief time-delay which is inherent in means 32 assures proper initial deployment of stabilization parachute 14 prior to release of the seat occupant. Actual separation is caused in part by the sequential deployment of parachutes 14 and 13 in response to the release of the lower risers of parachute 14 from the seat structure at attach points 35.

Incidental comments are also in order with respect to the ejection seat system disclosed in the drawings and specification. The value of the time-delay introduced in generator-actuator combination 32 is selected to assure release of the seat occupant from retention at an optimum time in the system ejection trajectory and parachute deployment sequence. In one version of our invention we have used a delay of 0.5 second with satisfactory results. In the FIG. 3 retention means arrangement cammed surfaces combined with lever extensions are locked against rotation for release by the cooperation of raised lands on the translatable shaft coupled to generator-actuator combination 32. After movement of the shaft by unit 32 in a rightward direction (FIG. 3), grooves cooperating adjacent the lands act to release the cams from restriction against rotation. Separation forces applied to the harness straps 19 cause the actual release which is required.

It is understood that the forms of the invention herewith shown and described are to be taken as preferred embodiments of the same, but that various changes in the proportioning, size, and detail of parts may be resorted to without departing from the spirit of the invention or the scope of the subjoined claims.

We claim:
1. In an ejection seat system for aircraft and the like, in combination:
   (a) aircraft structure,
   (b) seat structure supported by said aircraft structure and combined with means for forcibly ejecting said seat structure and the occupant thereof from said aircraft structure into an environmental airstream,
   (c) occupant retention harness means releasably connected to said seat structure,
   (d) personnel parachute means connected to said harness means,
   (e) seat stabilization parachute means releasably connected to said seat structure and also releasably connected to said personnel parachute means in deploying relation,
   (f) dual parallel parachute deployment means one of which initially deploys said seat stabilization parachute means when actuated and the other of which initially deploys said personnel parachute means in released relation to said stabilization parachute means when actuated, and
   (g) pressure-sensing and pressure-responsive selector means for selectively actuating one of said parallel parachute deployment means,
said selector means actuating that one of said dual parallel parachute deployment means which initially deploys said personnel parachute means in released relation to said seat stabilization parachute means when sensing an environmental combined low dynamic pressure and a high static pressure condition exterior to said aircraft structure as said seat structure is forcibly ejected from said aircraft structure.

2. In an ejection seat system for aircraft and the like, in combination:
   (a) aircraft structure,
   (b) seat structure supported by said aircraft structure and combined with means for forcibly ejecting said seat structure and the occupant thereof from said aircraft structure into an environmental airstream,
   (c) occupant retention harness means releasably connected to said seat structure,
   (d) personnel parachute means connected to said harness means,
   (e) seat stabilization parachute means releasably connected to said seat structure and also releasably connected to said personnel parachute means in deploying relation,
   (f) dual parallel parachute deployment means one of which initially deploys said seat stabilization parachute means when actuated and the other of which initially deploys said personnel parachute means in released relation to said stabilization parachute means when actuated, and
   (g) pressure-sensing and pressure-responsive selector means for selectively actuating one of said dual parallel parachute deployment means,
said selector means actuating that one of said dual parallel parachute deployment means which initially deploys said seat stabilization parachute means when sensing either one of an environmental high dynamic pressure condition and an environmental low static pressure condition exterior to said aircraft structure as said seat structure is forcibly ejected from said aircraft structure.

3. The ejection seat system defined by claim 1, wherein a separable lanyard means is provided to connect said seat stabilization parachute means in deploying relation to said personnel parachute means, and wherein that one of said dual parallel parachute deployment means which initially deploys said personnel parachute means in released relation to said stabilization parachute means is provided with a separate lanyard means that couples a deployment slug means to said personnel parachute means, said separate lanyard means separating said separable lanyard means into disconnected portions when deployed by said deployment slug means in response to actuation by said selector means in a sensed environmental combined low dynamic pressure and a high static pressure condition exterior to said aircraft structure as said seat structure is forcibly ejected from said aircraft structure.

4. The ejection seat system defined by claim 2, wherein said dual parallel parachute deployment means is provided with a deployment slug means, with a first lanyard means that is releasably coupled to said deployment slug means and that is fixedly coupled to said personnel parachute means, and with a second lanyard means that is releasably coupled to said deployment slug means and that is fixedly coupled to said seat stabilization parachute means, said dual parallel parachute deployment means releasing said first lanyard means from said deployment slug means when initially deploying said seat stabilization parachute means in response to actuation by said selector means in either one of a sensed environmental high dynamic pressure condition and a sensed environmental low static pressure condition exterior to said aircraft structure as said seat structure is forcibly ejected from said aircraft structure.

References Cited by the Examiner

UNITED STATES PATENTS

| | | | |
|---|---|---|---|
| 2,708,083 | 5/55 | Martin | 244—122 |
| 2,892,602 | 6/59 | Servanty | 244—141 |
| 2,950,885 | 8/60 | Hatfield | 244—141 |
| 2,995,322 | 8/61 | Pragnell | 244—141 |
| 3,020,011 | 2/62 | Beem et al. | 244—141 |
| 3,027,126 | 3/62 | Wallace | 244—141 |
| 3,140,067 | 7/64 | Johnston | 244—148 |

MILTON BUCHLER, *Primary Examiner.*

FERGUS S. MIDDLETON, *Examiner.*